United States Patent [19]

Hardy

[11] Patent Number: 4,533,150
[45] Date of Patent: Aug. 6, 1985

[54] CURVED-BODY MANEUVERABLE SNOW BOARD

[76] Inventor: Carl D. Hardy, 113 Woodend La., Medfield, Mass. 02053

[21] Appl. No.: 486,850

[22] Filed: Apr. 20, 1983

[51] Int. Cl.³ .............................................. A63C 5/04
[52] U.S. Cl. .................................. 280/12 H; 280/18; 280/609
[58] Field of Search ............... 280/18, 16, 21 R, 26, 280/12, 609, 606, 607, 12 H, 28; 441/68

[56] References Cited

U.S. PATENT DOCUMENTS

| | | | |
|---|---|---|---|
| 2,181,391 | 11/1939 | Burgeson | 280/18 |
| 2,829,902 | 4/1958 | Stocker | 280/18 |
| 3,176,999 | 4/1965 | Atcherley | 280/18 |
| 3,628,804 | 12/1971 | Carreiro | 280/609 |
| 3,900,204 | 8/1975 | Weber | 280/607 |
| 4,129,313 | 12/1978 | Benson | 280/12 H |
| 4,305,603 | 12/1981 | Müller | 280/609 |
| 4,343,485 | 8/1982 | Johnston | 280/609 |
| 4,386,982 | 6/1983 | Weinhaus | 441/68 |

Primary Examiner—Joseph F. Peters, Jr.
Assistant Examiner—Everett G. Diederiks
Attorney, Agent, or Firm—Donald W. Meeker

[57] ABSTRACT

Approximately vertical side walls are equally curved inwardly to form a waistlike narrow portion in the elongated body. A substantially flat bottom contact surface curves convexly downward to form a fulcrum at the low point. The fulcrum aligns with the centerlines of both side curves. A major portion of each side curve intersects a major portion of the bottom fulcrum curve to form a curved turning edge, which contacts the snow for its entire length when the snow board is tilted back over the fulcrum and to one side for steering. Protruding above a top flat ride-on surface are a rear foot stop and a double front foot stop for wedging the foot therebetween. Pivotally secured to an axle through the front foot stop a U-shaped handle pivots up for a stand-up balance and steering hand lever and down below the ride-on surface for storage, for a sit-down hand grip or for no-handle stand-up riding. Additional side grips, handle hold-down and safety release binding are optional.

24 Claims, 8 Drawing Figures

CURVED-BODY MANEUVERABLE SNOW BOARD

BACKGROUND OF THE INVENTION

1. Technical Field

The present invention relates to vehicles intended to be used on snow or ice, which vehicles are gravity propelled and operator-steered, and in partcular to a snow vehicle which is primarily intended for use with the occupant in a standing position and also providing other possible riding positions.

2. Background Art

Many prior art devices provide stand-up or sit-down sliding capability with a variety of steering mechanisms. They all seem to be either very elaborate with multiple parts and often separate rotating runners for steering or very simple and ineffective with small ridges extending from the body as steering means.

In other snow vehicles with elaborate levering mechanisms the ease of use and maneuverability are provided but at the expense of making a complex system. Other simple steering methods for steering snow vehicles involve a great deal of effort on the part of the operator to tilt the snow vehicles onto the curved bottom ridges or edges for steering.

DISCLOSURE OF INVENTION

The present invention provides efficient turning means by providing centerline alignment of multiple curves in the snow board body which optimize the turning effectiveness by allowing maximum contact of the combined curved edge steering portion with the snow under the area of highest weight concentration with no elaborate add-on steering appendages.

Maneuverability is optimized by providing a snow board with the center of the tilting fulcrum aligned with the center of the turning curve under the point of maximum weight concentration. Shifting ones weight towards the rear of the snow board while leaning in the direction one wishes to turn will result in steering the snow board in the desired direction with a minimum of effort.

Flexibility of use is provided by a longitudinally pivoting handle which produces lateral leverage for further ease of steering and yet pivots down out of the way below the level of foot placement for sit-down use holding the lowered handle, for storage or for stand-up use with no handle.

On the potentially slippery top surface of the snow board sure footing is ensured by providing a deeply grooved or textured top footing surface and by providing a raised rear foot stop and a double-raised front foot stop for wedging the front foot securely.

Simplicity of fabrication is ensured by the incorporation of the steering into the body shaped and by combining the grooved texture with the graphics and by combining the front foot stop with the pivot for the handle.

Because of the leaning, weight shifting and balancing in operating the snow board, users increase their skills in balance and coordination of body movements.

BRIEF DESCRIPTION OF THE DRAWINGS

These and other details and advantages of my invention will be described in connection with the accompanying drawings, which are furnished only by way of illustration but not in limitation of the invention, and in which drawings.

BEST MOST FOR CARRYING OUT THE INVENTION

Figure 1:
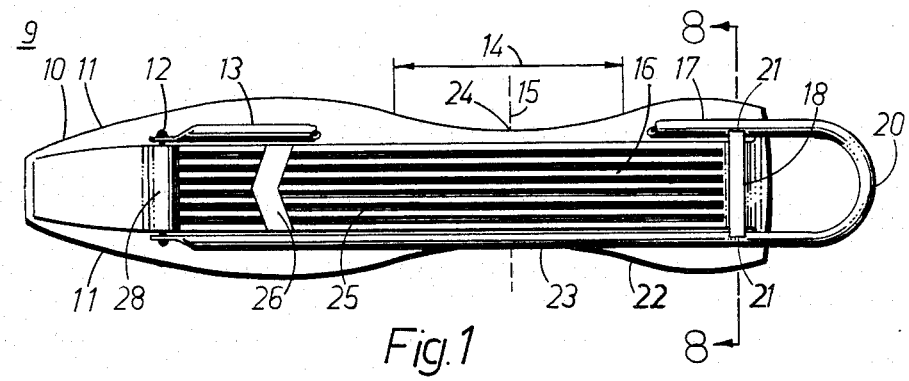
FIG. 1 is a top plan view of the snow board with the handle in the lowered position.
Figure 2:
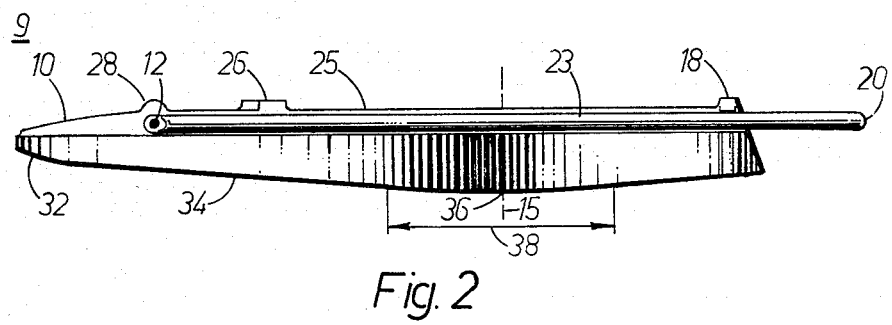
FIG. 2 is a side elevation view of the snow board with the handle in the lowered position.
Figure 3:
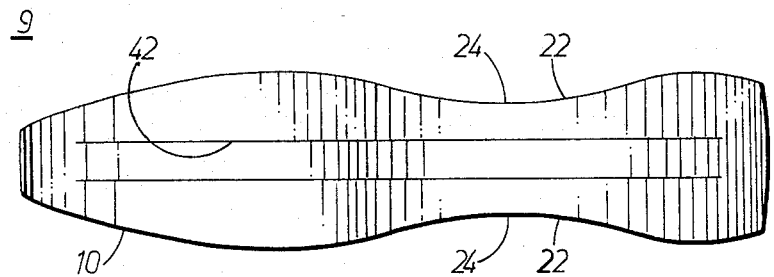
FIG. 3 is a bottom plan view of the snow board.

In FIGS. 1, 2 and 3 the snow board 9 comprises a main body 10 elongated in the direction of travel and formed of a durable light-weight material by any of a variety of techniques including:

rotationally molded polyethylene or polypropylene reaction injection molding fiber-reinforced material such as fiberglass, or injection molded of Lexan or other like substances.

In FIG. 1 nearly vertical longitudinal sides are formed into equal opposing longitudinal inwardly concave curves with center of curvature 15 (shown by a dashed line) to form a narrowed "waistlike" portion extending equally for a fraction of the length of the snow board (indicated by the distance 14).

Figure 5:
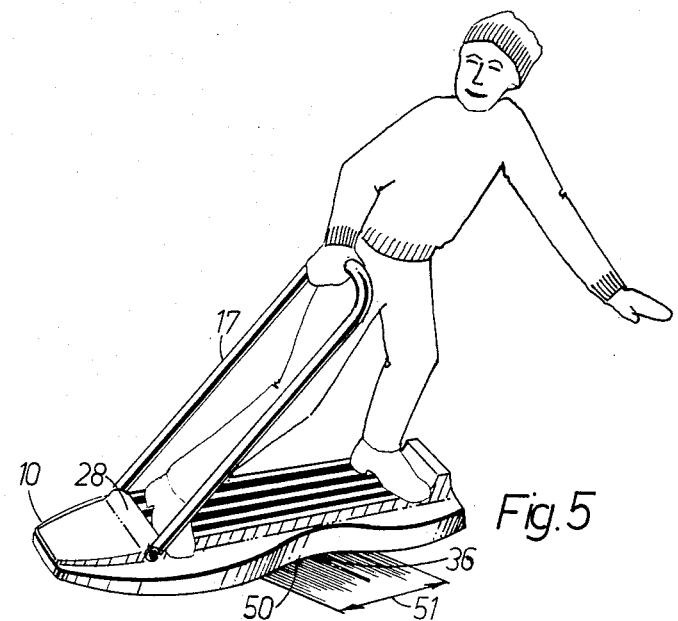
FIG. 5 is a perspective view of the snow board with a rider leaning into a turn.
Figure 6:
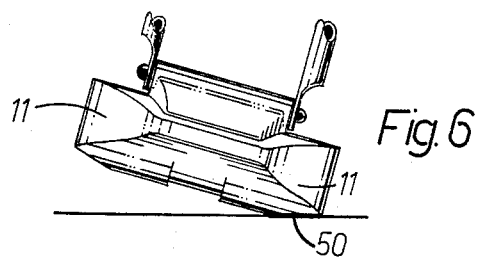
FIG. 6 is a front elevation view of the snow board tilted onto the curved turning edge.

In FIGS. 1 and 2 the bottom of the snow board is provided with an extensive substantially flat sliding contact area 34, which corresponds approximately to the surface area of one down hill snow ski recommended for the size of the user. The flat bottom sliding contact area 34 may have a slight convex curvature transversely across the snow board to aid in tilting the board, but the curvature should be sufficiently shallow to allow the entire sliding area 34 to contact the snow. Tangent to the flat sliding contact area 34 a longitudinal downwardly convex curve forming a fulcrum 36 at the center of curvature of the convex curve (indicated by dashed line 15) which coincides with the center of curvature of the side concave curves (also indicated by dashed line 15). Extending longitudinally for a fraction of the length of the snow board (indicated by the distance 38), the bottom fulcrum curve intersects each side curve to form a curved turning edge 50 with a substantial length of contact 51 with the snow as seen in FIGS. 5 and 6. When the snow board is tipped onto the fulcrum 36 and tilted to either side, the turning edge 50 rests flat on the snow with the edge cutting into the snow so that the snow board turns a curve approximately corresponding to the curvature of the turning edge 50. The front of the snow board is curved to a tapered nose with outwardly convex sides 11 so that the front of the snow board does not contact the snow in steering when the nose is elevated above the snow. Maneuverability and turning effectiveness are afforded by the turning edge's maximum contact area with the snow at the fulcrum point. Although the fulcrum and center-of-curvature of the aligned side curves may be located at any point along the length of the snow board, the optimum location for maneuverability is approximately two-thirds of the length from the intended front of the snow board, so that a natural backshift and lean produce the desired turn.

In FIG. 2 the intended front of the snow board is toward the left and marked by a small upturned nose 32 at the front preceding the bottom running surface 34 to prevent the nose of the snow board from diving down into the snow. Just the opposite effect is provided behind the fulcrum point. In FIGS. 1, 2 and 3, outwardly flaring side wedges 22 extend rearward of the fulcrum 36 (coincident with side curve centers 24). Shifting all of the rider's weight rearward of the fulcrum causes the smaller surface area of the snow board rearward of the fulcrum to sink into the snow and the flaring concave side wedges 22 to plow into the snow and act as a brake. The uplifted nose 32 and essentially flat bottom running surface 34 prevent the convexly tapering sides 11 on the front of the snow board from acting as a braking wedge but rather permit the front to break through the snow.

In FIG. 3 the snow board is provided along its bottom central longitudinal axis with a straight surface disconformity 42 to form a contact edge with the snow to provide lateral stability while sliding in a straight line and prevent side slip. The disconformity 42 may be one or more indented grooves or protruding ridges.

Figure 8:
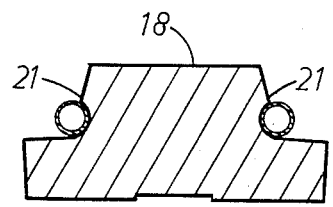
FIG. 8 is a transverse sectional view taken through 8—8 of FIG. 1.

In FIGS. 1 and 2 the substantially flat top ride-on surface 25 is elevated a sufficient distance above the bottom of the snow board so that a person's feet would not hit the snow if they hung over the edge on a turn. The top of the ride-on surface 25 is provided with surface irregularities 16, such as grooves and raised graphics to form a non-skid surface for the rider. By forming the ride-on surface 25 as a platform slightly elevated above and indented from the edges of the remainder of the snow board, a lower ridge is formed around the periphery of the ride-on surface which ridge serves as a resting area for the handle 17 when it is in the down position. Having the handle stored out of the way below the ride-on surface permits stand-up riding with no handle or sit-down riding using the lowered handle to hold onto the snow board. This hand-grip function of the handle in the sit-down position is further facilitated by some holding means securing the handle down such as protruding ends 21 of the rear foot-stop overhanging a portion of the handle as seen in FIGS. 1 and 8.

Figure 4:
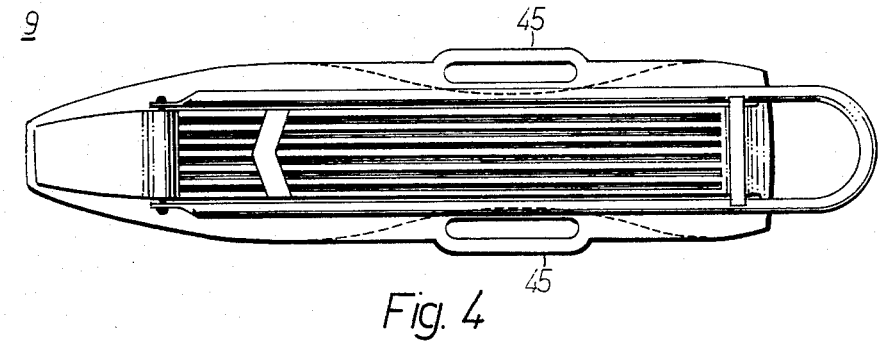
FIG. 4 is a top plan view of an alternate embodiment of a snow board with an additional hand-grip.

In FIG. 4 an alternate embodiment provides an extension of the ledge surface to each side but not the curved sides (dashed lines), with an opening provided adjacent each side edge to admit the fingers of the rider and form a hand grip 45 on each side for a rider in a seated position to hold on and aid in tilting.

Elevated above the ride-on surface a front foot-stop 28 and back foot-stop 18 further aid in the control of the snow board by providing leverage with the foot of the user pressing securely against the foot-stop. In the front foot placement area a forward-pointing V-shaped wedge 26 protrudes above the ride-on surface to act with the front foot-stop 28 to wedge the foot of the rider therebetween for more stability and control.

Figure 7:
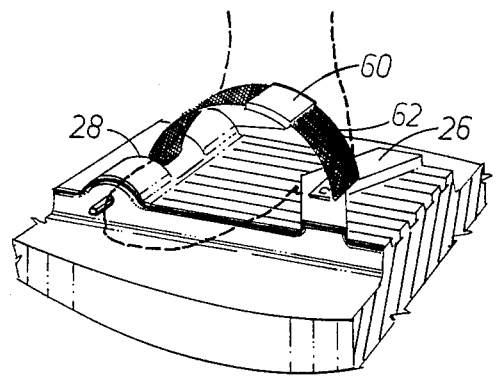
FIG. 7 is a perspective sectional view of the safety release binding.

In FIG. 7 an alternate embodiment shows an optional safety binding 62 with a release mechanism 60 mounted between the front foot-stop 28 and the wedge 26 to be secured over the front foot of the rider for further security and control. This safety binding would further serve to hold the snow board on the foot of the rider while using a chair lift.

In FIGS. 1, 2 and 5 an elongated handle 17 is provided of comfortable hand-holding height for the rider with the handle protruding upwardly from the snow board. Secured to the snow board for lateral rigidity, the handle 17 acts as a lever to assist in tilting the snow board to either side for steering and serves as a balancing aid. The preferred embodiment for optimum strength and usefulness with minimum structure is a longitudinally pivoting, but laterally rigid U-shaped handle 17 provided with two rigid arms 13 and 23 connecting a curved hand-gripping top 20. The U-shaped handle 17 is pivotally secured to the elevated front foot-stop 28 with an arm on each side of the foot-stop interconnected by an axle 12 in the form of a metal rod through the front foot-stop 28. The U-shaped handle 17, preferably of bent metal tubing, pivots upright for use as a lever in stand-up or kneeling riding and downward onto the snow board for storage, carrying, sit-down riding or upright riding without the handle.

In use by a standing rider the front foot of the rider is wedged between the front foot-stop 28 and the wedge 26 and the rear foot is placed behind the front foot with center of gravity forward of the fulcrum 36; thereby placing the weight of the rider over the flat sliding contact area 34 of the bottom for straight sliding.

To turn, the rear foot is moved backward onto or past the fulcrum 36 if the foot is not already in that position, and the weight of the rider is shifted to the rear foot to pivot the snow board backward onto the fulcrum; the rear foot may be back against the rear foot stop 18. The rider then leans to the side of desired turning direction by shifting the rider's weight and exerting force on the handle 17. The snow board then tilts to ride on the curved turning edge 50 which digs into the snow and turns the snow board approximately in the direction of curvature.

To stop, the rider may move the rear foot back well past the fulcrum 36 and thrust the rider's weight onto the back foot sinking the fulcrum into the snow with the side wedges 22 plowing into the snow to stop the snow board. Turning very abruptly to one side, as in skiing, will also stop the snow board.

It is understood that the preceding description is given merely by way of illustration and not in limitation of the invention and that various modifications may be made thereto without departing from the spirit of the invention as claimed.

I claim:

1. A highly maneuverable rigid snow board comprising an elongated body, of substantially greater depth in midsection that at each end and substantially flat on the top surface, substantially vertical longitudinal side surfaces provided with equal opposing inwardly concave curves in the side surfaces forming a "waistlike" narrowed portion between wider front and rear sections in plan view, and a substantially arched bottom comprising a longitudinal downwardly convex curve forming a fulcrum point separating a substantially flat bottom sliding contact area from a smaller upturned rear backshift area, and further comprising, at a front end a small upturned tip portion, wherein the centerlines of both side concave curves and the centerline of the bottom fulcrum with each side curve forms a long continuous curved bottom turning edge, the major central portion of which curved bottom turning edge rests flush with a flat snow surface to steer the snow board approximately in the direction of edge curvature when the snow board is pivoted onto the fulcrum and tilted to either side onto the curved bottom edge.

2. The snow board of claim 1 further comprising, along its bottom central longitudinal axis, at least ove straight surface disconformity contacting the snow to prevent side slip.

3. The snow board of claim 1 wherein the curved bottom edge is located at an end of the snow board with the centerline of curvature located from the end approximately one third of the length of the board.

4. The snow board of claim 1 wherein the substantially flat top surface further comprises front and rear foot stops wherein the front foot stop comprises two raised transverse ridges spaced apart by a distance sufficient to wedge a foot therebetween, wherein the rearward ridge is angled rearwardly from a snow board centerline to each side edge of the snow board.

5. The snow board of claim 1 wherein the substantially flat top surface further comprises front and rear foot stops protruding above the top surface and a pivoting handle, wherein the front foot stop protrusion houses a pivoting means for the handle.

6. The snow board of claim 1 further comprising a longitudinally pivoting handle having two spaced rigid arms connected by a gripping portion at one end and pivotally connected to the snow board at the opposite end, and still further comprising a top surface provided with a central elevated foot placement surface surrounded by a narrow lower ridge upon which the handle may rest when pivoted down to the top surface below the foot level of the user, permitting standing use of the snow board both with and without the handle.

7. The invention of claim 6 further comprising a means of removably securing the handle down onto the top surface of the snow board sufficiently securely so that the handle may be grasped while riding the snow board in seated and kneeling positions.

8. The invention of claim 7 wherein the handle securing means comprises a side extension of each rear foot stop over the handle in the down position.

9. The snow board of claim 1 further comprising a hand-gripping means secured along each side of the snow board for grasping during seated and kneeling use of the snow board.

10. The snow board of claim 1 further comprising at least one safety foot-binding means of securing a foot releasably to the snow board.

11. The snow board of claim 1 further comprising a handle extending upwardly from the body of the snow board, which handle is rigidly secured laterally for exerting side pressure to tilt the snow board.

12. The snow board of claim 1 wherein the curved bottom edge flares outwardly from the fulcrum in a direction away from the direction of travel of the snow board, wherein rapidly applied pressure on the board above the outwardly flared edge causes a reduced surface area behind the fulcrum to sink into the snow and the flared edges plow into the snow to act as a brake.

13. A highly maneuverable rigid snow board comprising an elongated body of substantially greater depth in midsection than at each end, substantially vertical side surfaces with equal opposing inwardly concave curves in the side surfaces forming a "waistlike" narrowed portion between wider front and rear sections in plan view, and a substantially arched bottom comprising a longitudinal downwardly convex curve forming a fulcrum point separating a substantially flat bottom sliding contact area from a smaller upturned rear backshift area, and further comprising at a front end a small upturned tip portion, wherein the centerlines of both side concave curves and the centerline of the bottom fulcrum curve are coincident so that the intersection of the bottom fulcrum curve with each side curve forms a long continuous curved bottom turning edge, the major central portion of which curved bottom turning edge rests flush with a flat snow surface to steer the snow board approximately in the direction of turning edge curvature when the snow board is pivoted onto the fulcrum and tilted to either side onto the curved turning edge, wherein at least one straight surface disconformity is provided in the bottom surface along a longitudinal axis, and further comprising a substantially flat top ride-on surface provided with upwardly protruding front and rear foot stops.

14. The snow board of claim 13 further comprising a handle secured to the snow board which handle pivots longitudinally from a raised lever position approximately orthogonal to the snow board to a lowered position approximately parallel to the snow board and wherein the handle is rigid in a transverse direction to aid in tilting the snow board to either side.

15. The snow board of claim 14 wherein the handle is pivotally secured to a rotatable member secured to the front foot stop.

16. The snow board of claim 14 wherein the handle comprises two arms which straddle the ride-on surface in the lowered position and further provided with a lateral extension of each end of the rear foot stop which extension overhangs a portion of an arm of the handle in the lowered position to secure the handle removably in the lowered position.

17. The snow board of claim 13 wherein the top ride-on surface further comprises an additional upward protrusion spaced rearwardly of the front foot stop a sufficient distance to allow a foot of a rider to be wedged therebetween, and the rearwardly spaced additional protrusion is angled rearwardly from a snow board centerline to each snow board side edge.

18. The snow board of claim 17 further comprising at least one safety foot-binding means attached between the foot-wedging protrusions for releasably securing a foot to the snow board.

19. The snow board of claim 13 further comprising a hand-gripping means secured along each side of the snow board for grasping during seated and kneeling use of the snow board.

20. The snow board of claim 13 wherein the curved bottom edge is located at an end of the snow board with the centerline of curvature located from the end approximately one third of the length of the board.

21. A highly maneuverable snow board comprising an elongated body having substantially vertical longitudinal side surfaces provided with equal opposing inwardly concave curves in the side surfaces forming a "waistlike" narrowed portion in plan view, and a substantially flat bottom sliding contact area, provided at one end with a small upturned portion and along the length of the bottom provided with a longitudinal downwardly convex fulcrum curve, wherein the centerlines of both side concave curves and the centerline of the bottom fulcrum curve are coincident so that the intersection of the bottom fulcrum curve with each side curve forms a curved bottom turning edge, the major central portion of which curved bottom turning edge rests flush with a flat snow surface to steer the snow board approximately in the direction of edge curvature when the snow board is pivoted onto the fulcrum and tilted to either side onto the curved bottom edge, and further comprising a longitudinally pivoting handle having two spaced rigid arms connected by a gripping portion at one end and pivotally connected to the snow board at the opposite end, and still further comprising a top surface surrounded by a narrow lower ridge upon which the handle may rest when pivoted down to the top surface below the foot level of the user, permitting standing use of the snow board both with and without the handle.

22. The invention of claim 21 further provided with a means of removably securing the handle down onto the top surface of the snow board sufficiently securely so that the handle may be grasped while riding the snow board in seated and kneeling positions.

23. The invention of claim 22 wherein the handle securing means comprises a side extension of each rear foot stop over the handle in the down position.

24. A highly maneuverable snow board comprising an elongated body having substantially vertical side surfaces with equal opposing inwardly concave curves in the side surfaces forming a "waistlike" narrowed portion in plan view, and a substantially flat bottom sliding contact area, provided at one end with a small upturned portion, and along the length of the bottom, provided with a longitudinal downwardly convex fulcrum curve, wherein the centerlines of both side concave curves and the centerline of the bottom fulcrum curve are coincident to that the intersection of the bottom fulcrum curve with each side curve forms a curved bottom turning edge, the major central portion of which curved bottom turning edge rests flush with a flat snow surface to steer the snow board approximately on the direction of turning edge curvature when the snow board is pivoted onto the fulcrum and tilted to either side onto the curved turning edge, wherein at least one straight surface disconformity is provided in the bottom surface along a longitudinal axis, and further comprising a substantially flat top ride-on surface provided with upwardly protruding front and rear foot stops, and wherein the handle is provided with two arms which straddle the ride-on surface in the lowered position and further provided with a lateral extension of each end of the rear foot stop which extension overhangs a portion of an arm of the handle in the lowered position to secure the handle removably in the lowered position.

* * * * *